(12) United States Patent
Young et al.

(10) Patent No.: US 8,321,482 B2
(45) Date of Patent: Nov. 27, 2012

(54) SELECTIVELY MODIFYING FILES OF A CONTAINER FILE

(75) Inventors: Blaine R. Young, Redmond, WA (US); Bruce L. Green, Seattle, WA (US); Raja S. Ganjikunta, Redmond, WA (US); Minxiao Zhou, Bellevue, WA (US); Brett A. Muzzey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 528 days.

(21) Appl. No.: 12/111,185

(22) Filed: Apr. 28, 2008

(65) Prior Publication Data

US 2009/0271442 A1    Oct. 29, 2009

(51) Int. Cl.
G06F 12/00    (2006.01)
G06F 17/30    (2006.01)
G06F 7/00    (2006.01)

(52) U.S. Cl. .................. 707/822; 707/828; 707/781
(58) Field of Classification Search .................. 707/651, 707/822, 828
See application file for complete search history.

(56) References Cited

U.S. PATENT DOCUMENTS

| | | | |
|---|---|---|---|
| 5,991,753 A * | 11/1999 | Wilde ................................... | 1/1 |
| 6,125,373 A | 9/2000 | Momoh | |
| 6,269,382 B1 * | 7/2001 | Cabrera et al. ...................... | 1/1 |
| 6,341,341 B1 | 1/2002 | Grummon et al. | |
| 6,857,001 B2 | 2/2005 | Hitz et al. | |
| 7,085,785 B2 | 8/2006 | Sawdon et al. | |
| 7,155,710 B2 | 12/2006 | Breckner et al. | |
| 7,197,520 B1 * | 3/2007 | Matthews et al. .................... | 1/1 |
| 7,234,077 B2 | 6/2007 | Curran | |
| 7,257,652 B2 | 8/2007 | Gilliam | |
| 7,284,015 B2 * | 10/2007 | Pudipeddi et al. .................... | 1/1 |
| 7,546,431 B2 | 6/2009 | Stacey et al. | |
| 8,112,464 B2 | 2/2012 | Young et al. | |
| 2003/0177107 A1 | 9/2003 | Brown | |
| 2003/0187822 A1 | 10/2003 | Lefurgy et al. | |
| 2005/0010747 A1 | 1/2005 | Gilliam | |
| 2005/0033932 A1 * | 2/2005 | Pudipeddi et al. ............. | 711/162 |
| 2005/0267844 A1 * | 12/2005 | Gallant et al. .................. | 705/51 |
| 2006/0179261 A1 | 8/2006 | Rajan | |
| 2006/0212481 A1 | 9/2006 | Stacey et al. | |
| 2006/0224636 A1 | 10/2006 | Kathuria et al. | |
| 2007/0016622 A1 * | 1/2007 | Havewala et al. ............. | 707/200 |
| 2007/0016631 A1 * | 1/2007 | Robert et al. ................. | 707/204 |
| 2007/0078801 A1 | 4/2007 | Guruprakash | |
| 2008/0010284 A1 | 1/2008 | Beck | |

(Continued)

OTHER PUBLICATIONS

"Snapshot Volumes", retrieved at <<http://www.centos.org/docs/5/html/Cluster_Logical_Volume_Manager/snapshot_volumes...>>, Red Hat, Inc., pp. 2.

(Continued)

Primary Examiner — Robert Beausoliel, Jr.
Assistant Examiner — Hexing Liu
(74) Attorney, Agent, or Firm — Wolfe-SBMC (57) ABSTRACT

A stub directory is written out to a storage device for multiple files in a container file, the stub directory including identifiers of the multiple files but excluding data of the multiple files. In response to a request to access one file of the multiple files, the data of the one file is written out to the storage device. A requested modification is allowed to be performed on the one file written out to the storage device to generate a modified version of the file. After modification of the one file is completed, a previous version of the file in the container file is replaced with the modified version of the file.

18 Claims, 7 Drawing Sheets

U.S. PATENT DOCUMENTS

2009/0063556 A1* 3/2009 Nemoto et al. ............ 707/103 R
2009/0150533 A1 6/2009 McClanahan et al.
2009/0271451 A1 10/2009 Young

OTHER PUBLICATIONS

"XIV—NextraTM Snapshot Implementation", White Paper, Sep. 2007, XIV Ltd., pp. 19.

"What is WinImage?", Gilles Vollant Software, 2005, pp. 3.

"TreeView Populate on Demand", Retrieved from http://www.devdirect.com/ALL/eowebtreeview_SOLN_00010072.aspx on Sep. 30, 2008. 1 Page.

"AJAX Load-on-Demand Directory", Retrieved from http://demos.mcmscontrols.com/ASPNET/Treeview/Examples/Proqramminq/ClientLoadOnDemandDirectory/DefaultVB.aspx on Sep. 30, 2008. 1 Page.

Kirkham, Chris "Distributed File Systems", Retrieved from http://www.cs.man.ac.uk/~chris/cs3052/ch9.pdf., 4 Pages.

"Differences between Autodir and Autofs", Retrieved from http://tldp.org/HOWTO/Autodir-HOWTO/x130.html on Sep. 30, 2008., 1 Page.

"Understanding the Automounter Implementation", Retrieved from http://www.nersc.gov/vendor_docs/ibm/pssp/admin/am0a0mst79.html on Sep. 30, 2008., 6 Pages.

"Notice of Allowance", U.S. Appl. No. 12/342,680, (Sep. 30, 2011), 9 pages.

"Supplemental Notice of Allowance", U.S. Appl. No. 12/342,680, (Jan. 10, 2012), 3 pages.

* cited by examiner

SELECTIVELY MODIFYING FILES OF A CONTAINER FILE

BACKGROUND

Container files typically include multiple different files and directories. These files can be computer programs or other digital content, and can number into the hundreds, thousands, or more. Although grouping together multiple files and directories into a single container file can make it easier to distribute those files and directories, there are problems with these container files. One problem with container files is the manner in which changes can be made to files in the container file. Typically in order to make such changes, all of the files are copied from the container file onto a disk, the desired changes are made to some of the files, and then all of the files are stored back into the container file. This is problematic because, as the number of files in the container file can be very large, a significant amount of time can be spent on this process of copying to disk and storing back to the container file.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the selectively modifying files of a container file, a stub directory is written out to a storage device for multiple files in a container file, the stub directory including identifiers of the multiple files but excluding data of the multiple files. In response to a request to access one file of the multiple files, the data of the one file is written out to the storage device. A requested modification is allowed to be performed on the one file written out to the storage device to generate a modified version of the file. After modification of the one file is completed, a previous version of the file in the container file is replaced with the modified version of the file.

In accordance with one or more aspects of the selectively modifying files of a container file, a status value is received from a file system, the status value indicating that a request to access a file failed because an access control tag associated with the file was set. A request is sent to a container modification module to have the file extracted from the container file and written out to a storage device and, after the file is extracted from the container file and written out to the storage device, the access control tag associated with the file is cleared and the request is reissued to the file system.

BRIEF DESCRIPTION OF THE DRAWINGS

The same numbers are used throughout the drawings to reference like features.

DETAILED DESCRIPTION

Selectively modifying files of a container file is discussed herein. Generally, in order to make changes to one or more files in a container file, a stub directory for the files and directories in the container file is written out to a storage device (such as a disk). This stub directory includes the names of the files and directories in the container file as well as the directory structure of those files and directories. The stub directory need not, however, include the actual data for each file. When a request to access a file is received, the data for that file is retrieved from the container file and written out to the storage device. Any desired modifications to that file can be made, and then all of the modified files are stored back into the container file. Accordingly, no time need be spent writing out files to the storage device from the container file, and then writing those files back into the container file, if no changes are made to those files.

Figure 1:
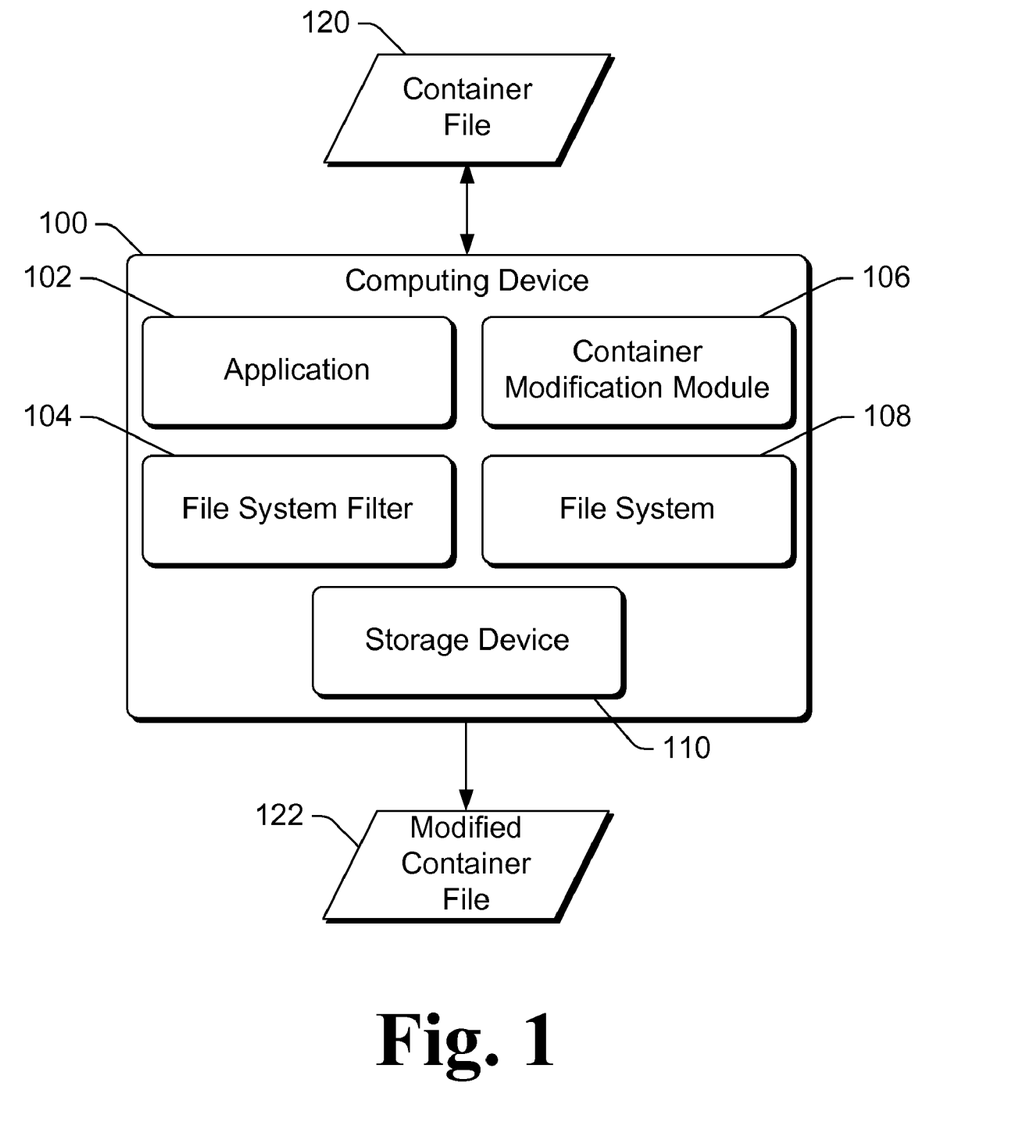
FIG. 1 is a block diagram illustrating an example computing device implementing the selectively modifying files of a container file in accordance with one or more embodiments.

FIG. 1 is a block diagram illustrating an example computing device 100 implementing the selectively modifying files of a container file in accordance with one or more embodiments. Computing device 100 can be a variety of different devices capable of accessing container files. For example, computing device 100 can be a desktop computer, a mobile station, an entertainment appliance, a set-top box communicatively coupled to a display device, a television, a wireless phone, a game console, an automotive computer, and so forth. Thus, computing device 100 may range from a full resource device with substantial memory and processor resources (e.g., personal computers, game consoles) to a low-resource device with limited memory and/or processing resources (e.g., traditional set-top boxes, hand-held game consoles).

Computing device 100 includes an application 102, a file system filter 104, a container modification module 106, a file system 108, and a storage device 110. Although illustrated in FIG. 1 as being part of a same computing device 100, one or more of application 102, file system filter 104, container modification module 106, file system 108, and storage device 110 can be implemented on different devices. For example, application 102 could be implemented on a separate device, storage device 110 could be a separate device external to computing device 100, and so forth.

A container file 120 is accessed by computing device 100, one or more files in container file 120 are modified, and computing device 100 generates a modified container file 122. Application 102 requests changes or modifications to be made to files in container file 120. Container modification module 106 provides a toolset for extracting individual files from container file 120 and restoring files to container file 120. File system 108 manages creation of, reading from, and writing to files and directories on storage device 110. File system filter 104 assists in modifying individual files of container file 120, as discussed in more detail below.

Storage device 110 can be a variety of different storage devices, such as magnetic or optical discs, Flash memory, removable or fixed memory, and so forth. Although storage device 110 is illustrated as being part of computing device 100, alternatively storage device 110 can be a remote storage device coupled to computing device 100, such as via a local area network (LAN), the Internet, a local connection (e.g., a Universal Serial Bus (USB) connection), and so forth.

Container file 120 includes multiple files and one or more directories (also referred to as folders), typically in a compressed form. These files and directories can be compressed using a variety of different (typically lossless) compression techniques. Container file 120 also records the directory structure for these files and directories. The directory structure refers to which files are included in which directories, and which directories are included in which other directories. A variety of different types of files can be included in container file 120, such as computer program files, libraries, data files, text files, image files, audio (e.g., song) files, video files, and so forth. The particular files included in a particular container file 120 can vary and are based on the desires of the creator of container file 120. The number of files and directories in container file 120 can vary, and oftentimes can be very large, such as ranging into the thousands, tens of thousands, or even more files.

Container file 120 can be implemented in accordance with a variety of different formats or protocols. For example, container file 120 can be a Windows Imaging Format (WIM) file, Cabinet (CAB) file, a ZIP file, and so forth. Container file 120 is accessed by computing device 100, and in one or more embodiments is stored in memory or a storage device (e.g., device 110) of computing device 100.

Reference is made herein to writing out a file or directory of container file 120. Writing out a directory from container file 120 refers to creating a directory on storage device 110 (or alternatively another memory or storage device) allowing file system 108 to access that directory. Similarly, writing out a file from container file 120 refers to creating a file on storage device 110 (or alternatively another memory or storage device) having the same data as the file in container file 120, allowing file system 108 to access the file. This writing out of a directory and/or file typically includes decompressing the data being written out. Typically, file system 108 is not able to access (e.g., read from and/or write to) individual files and directories in container file 120 until those files and directories have been written out from container file 120.

Figure 2:
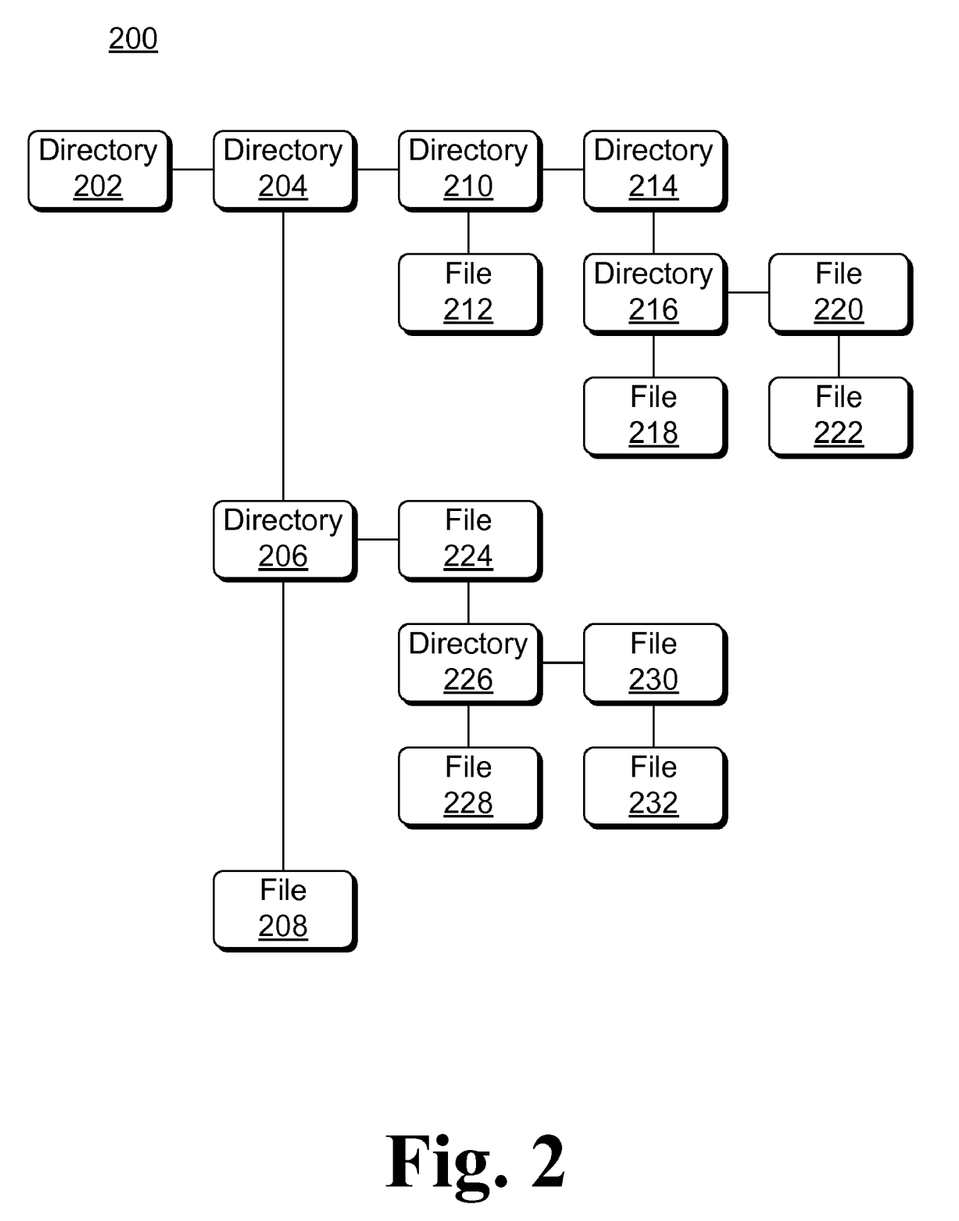
FIG. 2 illustrates files and directories in an example container file in accordance with one or more embodiments.

FIG. 2 illustrates files and directories in an example container file 200 in accordance with one or more embodiments. In the example of FIG. 2, directories or files linked by a vertical line refer to peers within a same directory, while directories or files linked by a horizontal line refer to children of a directory. Container file 200 includes a top-level directory 202 that includes two directories 204 and 206 and a file 208. Directory 204 includes a directory 210 and a file 212. Directory 210 in turn includes two directories 214 and 216 and a file 218. Directory 216 includes two files 220 and 222. Additionally, directory 206 includes two files 224 and 228 and a directory 226. Directory 226 in turn includes two files 230 and 232.

The files and directories included in container file 200 are illustrated in FIG. 2 along with the directory structure of those files and directories. Container file 200 is shown including only a few files and a few directories in order to avoid cluttering the drawing. It is to be appreciated, however, that numerous additional directories and/or files can be included in container file 200.

Additionally, container file 200 is shown including a top-level directory 202. All other directories and files are illustrated as being included in top-level directory 202 or in a directory chain that leads up to top-level directory 202. Alternatively, no such top-level directory need be included in container file 200. For example, all of the directories and files illustrated in FIG. 2 except for top-level directory 202 could be included in container file 200.

Returning to FIG. 1, situations can arise where a user desires to make changes to some of the files in container file 120. Such situations can arise, for example, when a vendor desires to make changes to a program being distributed using container file 120, when a user desires to add digital watermarks to one or more images in container file 120, when a user desires to add licenses to one or more audio files in container file 120, and so forth.

Generally during operation, application 102 requests to make modifications to files within container file 120. In one or more embodiments, application 102 displays or otherwise presents a user interface to a user of computing device 100 allowing the user to select particular files from container file 120 and input desired modifications or changes to those files. Alternatively, application 102 can be programmed to automatically make modifications or changes to such files.

In order to display the directory structure of the files and directories in container file 120, and also to make a change to a file in container file 120, container modification module 106 writes out a stub directory for one or more files and/or directories in container file 120. This writing out or creating of the stub directory is also referred to as mounting the stub directory on storage device 110. A stub directory for container file 120 includes the directory structure for at least a portion of container file 120, including names or other identifiers of files and/or directories in container file 120, but initially excludes the data in the files. This data can be included at a later time when a modification is to be made to a file as discussed in more detail below. Thus, when the stub directory for container file 120 is initially written out, file system 108 can identify the particular files and/or directories written out in the stub directory, but cannot yet access the data in the files in the stub directory.

By writing out the stub directory for container file 120 the directory structure can be easily identified by application 102 but no time is spent writing out the data of the files. For example, referring to FIG. 2, in one or more embodiments a stub directory for container file 200 would include the directory structure illustrated in FIG. 2 including the names of the various directories and files, but would not include the data of the files illustrated in FIG. 2.

Returning again to FIG. 1, it is to be appreciated that multiple different container files 120 can be accessed by computing device 100. Application 102 identifies, to container modification module 106, a particular container file 120 for which files are to be modified. Container modification module 106 accesses container file 120 and identifies the files, directories, and directory structure from container file 120. Container modification module 106 communicates this accessed information to file system 108 in order for file system 108 to write out the stub directory for container file 120.

Each file identified in the stub directory has an associated access control tag. The access control tag associated with a particular file indicates that that particular file is flagged for particular treatment. The access control tag also identifies a particular location of the associated file in container file 120. This identifier of the particular location is maintained even if the file is moved, allowing the location of the associated file in container file 120 to be known despite any such movement.

In the selectively modifying files of a container file discussed herein, the access control tag is also used to indicate that the associated file has not had its data extracted from container file 120. This access control tag can be implemented in a variety of different manners. In one or more embodiments where file system 108 employs the NT file system (NTFS), such as various members of the Windows® operating system family of operating systems available from Microsoft Corp. of Redmond, Wash., this access control tag is referred to as a reparse tag of a reparse point. The reparse tag indicates that the associated file has not had its data extracted from the container file. Additional information regarding the NT file system and reparse points is available from Microsoft Corporation.

In one or more embodiments, each directory in the stub directory also has an associated access control tag. The access control tag associated with a particular directory indicates that that particular directory is flagged for particular treatment. The access control tag also identifies a particular location of the associated directory in container file 120, and is maintained even if the directory is moved. In the selectively modifying files of a container file discussed herein, the access control tag is used to indicate that the associated directory has not had its data extracted from container file 120. The data for a particular directory refers to the files and any other directories within that particular directory. The data for a particular directory typically does not, however, include the data for the files in that directory or the data for any directories within that directory. In one or more embodiments, the access control tag is referred to as a reparse tag of a reparse point. The reparse tag indicates that the associated directory has not had its data extracted from the container file.

For example, referring to FIG. 2, assume that directory 210 has an associated access control tag that is set. The access control tag of directory 210 being set indicates that the data identifying directories 214 and 216, as well as the data identifying files 218, 220 and 222, as being included in directory 210 has not been extracted from container file 120 yet.

Referring again to FIG. 1, when application 102 requests access to a file or directory in the stub directory, file system 108 checks whether the access control tag associated with the requested file and/or directory is set. If the associated access control tag is not set for the file and/or directory, then the data for the requested file and/or directory is included in the stub directory. However, if the associated access control tag is set, data for the requested file and/or directory is not included in the stub directory.

Accordingly, when file system 108 receives a request for access to a file for which the associated access control tag is set, file system 108 returns an indication that the access control tag for that file is set. File system filter 104 receives this indication and communicates with container modification module 106 to extract the data for the requested file from container file 120. Container modification module 106 writes out the extracted data for the requested file to storage device 110 by sending a request to file system 108 to write out the data for the file to storage device 110. File system filter 104 then clears the access control tag associated with that file, and resubmits the request for access to the file to file system 108. As the associated access control tag is no longer set, and the data for the requested file has been extracted from container file 120, the requested file can be accessed by application 102 and modifications to the file can be made.

Similarly, when file system 108 receives a request for access to a directory for which the associated access control tag is set, file system 108 returns an indication that the access control tag for that directory is set. This access control tag being set indicates that the data for the directory is not included in the stub directory. File system filter 104 receives this indication and communicates with container modification module 106 to extract the data for the requested directory from container file 120. Container modification module 106 writes out the extracted data for the requested directory to storage device 110 by sending a request to file system 108 to write out the data for the directory to storage device 110. File system filter 104 then clears the access control tag associated with that directory, and resubmits the request for access to the directory to file system 108. As the associated tag is no longer set, and the data for the requested directory has been extracted from container file 120, the requested directory can be accessed by application 102 and the contents of the requested directory displayed to a user of application 102 (or otherwise accessed by application 102).

As discussed above, file system filter 104 receives (also referred to as intercepts) the indication from file system 108 that an access control tag associated with a particular file or directory has been set. File system filter 104 can receive this indication in different manners. In one or more embodiments, upon detecting an access control tag being set, file system filter 108 finds the particular file system filter (filter 104 in this case) associated with that access control tag and sends the indication to that file system filter. Alternatively, different techniques can be use for file system filter 104 to receive this indication. For example, file system filter 104 can register with file system 108 or another component of an operating system running on computing device 100 to receive any notifications or indications sent by file system 108. By way of another example, all communications between application 102 and file system 108 could pass through file system filter 104, so any indications returned by file system 108 could be intercepted by file system filter 104.

Each file to be modified is thus extracted from container file 120 in response to a request to access that file. After the file has been modified, container modification module 106 replaces the version of the file in container file 120 with the modified version of the file. In one or more embodiments, this replacement occurs after all the files in container file 120 to be modified have been modified. Alternatively, this replacement can occur at other intervals, such as on an individual file by file basis as modifications to the files are completed. Completing modification of a file or set of files can be determined in different manners, such as based on input by a user of application 102 (e.g., user selection of an "quit" or "finish" option) or automatically by application 102 or module 106 (e.g., after a threshold amount of time has elapsed, when application 102 is closed, when a new container file 120 is selected by application 102, and so forth).

Modern operating systems (e.g., many of those in Windows® operating system family of operating systems) typically include multiple privilege levels, often referred to as user and kernel modes of operation. Kernel-mode is usually associated with and reserved for portions of the operating system. Kernel-mode components run in a reserved address space, which is protected from user-mode components. User-mode components have their own respective address spaces, and can make calls to kernel-mode components using special procedures that employ transitions from one privilege level to another. In one or more embodiments, application 102, file system filter 104, and module 106 are user-mode components, while file system 108 is a kernel-mode process. Having file system filter 104 and module 106 as user-mode components allows the selectively modifying files of a container file discussed herein to be largely implemented in a user-mode component that interacts with file system 108 rather than requiring significant modification to file system 108. However, it is to be appreciated that one or more of application 102, file system filter 104, and module 106 can alternatively be employed as kernel-mode components.

Figure 3:
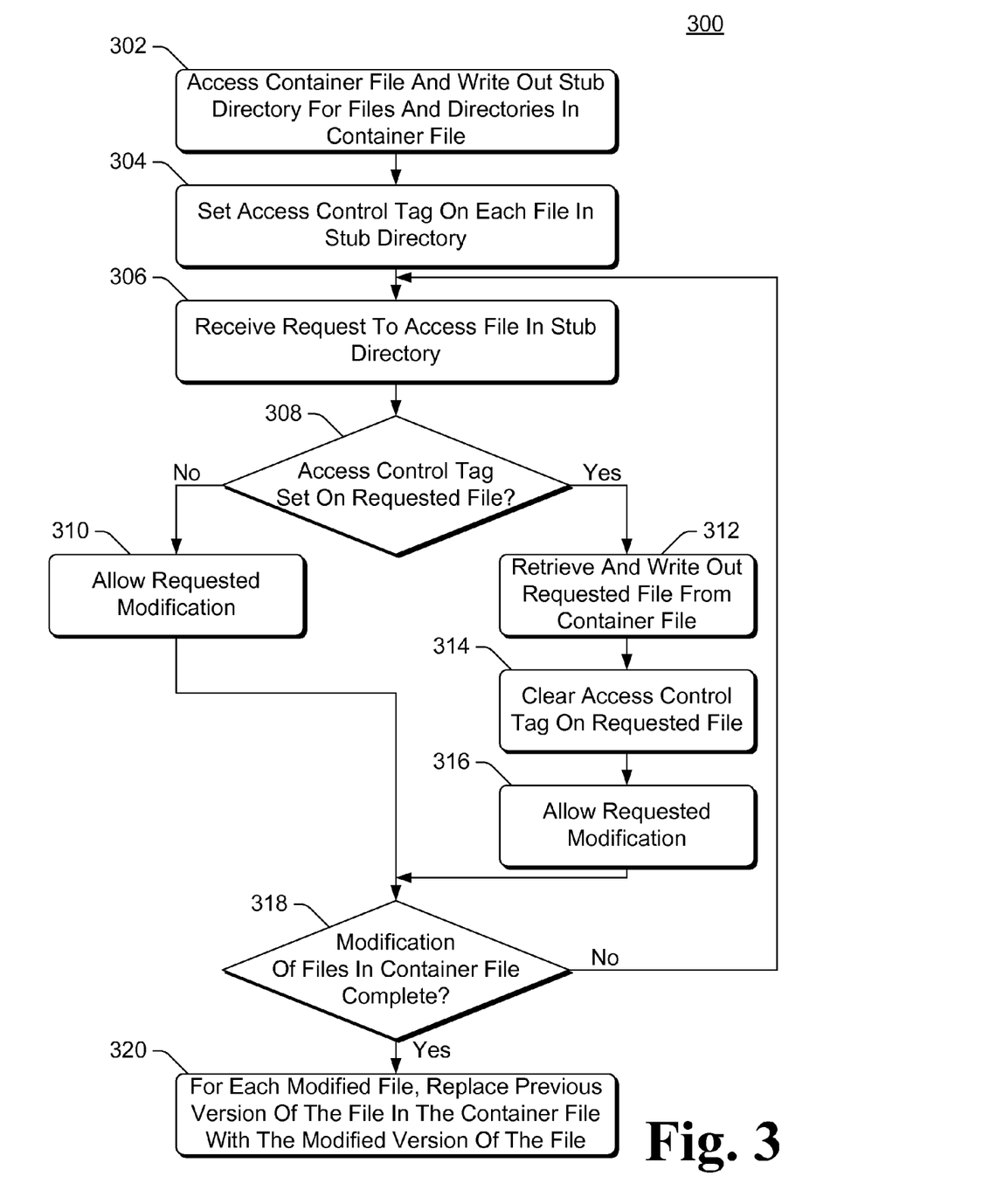
FIG. 3 is a flowchart illustrating an example process for selectively modifying files of a container file in accordance with one or more embodiments.

FIG. 3 is a flowchart illustrating an example process 300 for selectively modifying files of a container file in accordance with one or more embodiments. Process 300 is carried out by a device, such as computing device 100 of FIG. 1, and can be implemented in software, firmware, hardware, or combinations thereof. Process 300 is an example process for selectively modifying files of a container file; additional discussions of selectively modifying files of a container file are included herein with reference to different figures. Process 300 illustrates an example in which access control tags are associated with files but not with directories.

Initially, a container file is accessed and a stub directory is written out for files and directories in the container file (act 302). As discussed above, the stub directory excludes the data of the files identified in the stub directory. An access control tag is set on each file in the stub directory (act 304).

A request to access a file in the stub directory is received (act 306), and in response to this request a check is made as to whether the access control tag associated with the requested file is set (act 308). If the access control tag is not set, then any requested modification are allowed on the file (act 310). These requested modifications are received from, for example, application 102 of FIG. 1.

However, if the access control tag is set, then the requested file is retrieved from the container file and written out to the storage device (act 312). The access control tag on the requested file is cleared (act 314), and any requested modifications are allowed on the file (act 316). These requested modifications are received from, for example, application 102 of FIG. 1.

After modification of the requested file is performed in act 310 or act 316, a check is made as to whether modification of files in the container file is complete (act 318). Process 300 can also proceed to act 318 without any modification having been performed on the requested file. For example, process 300 can proceed if an indication is received that no modification will be made at this time, if a request to access another file or directory is received, and so forth. If modification of files in the container file is not complete, then process 300 returns to act 306 and another request to access a file in the stub directory is received.

However, if modification of files in the container file is complete, then for each modified file, the previous version of that file in the container file is replaced with a modified version of the file (act 320). These modified versions of the file are those created when the requested modifications are performed in acts 310 and/or 316. The modified files can be identified in different manners. In one or more embodiments, each file having an associated access control tag that has been cleared is identified as having been modified (regardless of whether any modification was actually made to the file). Alternatively, the modified files can be identified in other matters such as by comparing the contents of the file written out to the contents of the file in the container file, by comparing a timestamp of when the file was written out to a timestamp of when the file was last written to and/or accessed (e.g., if the two timestamps are not the same and the file is identified as having been modified), and so forth.

Figure 4A:
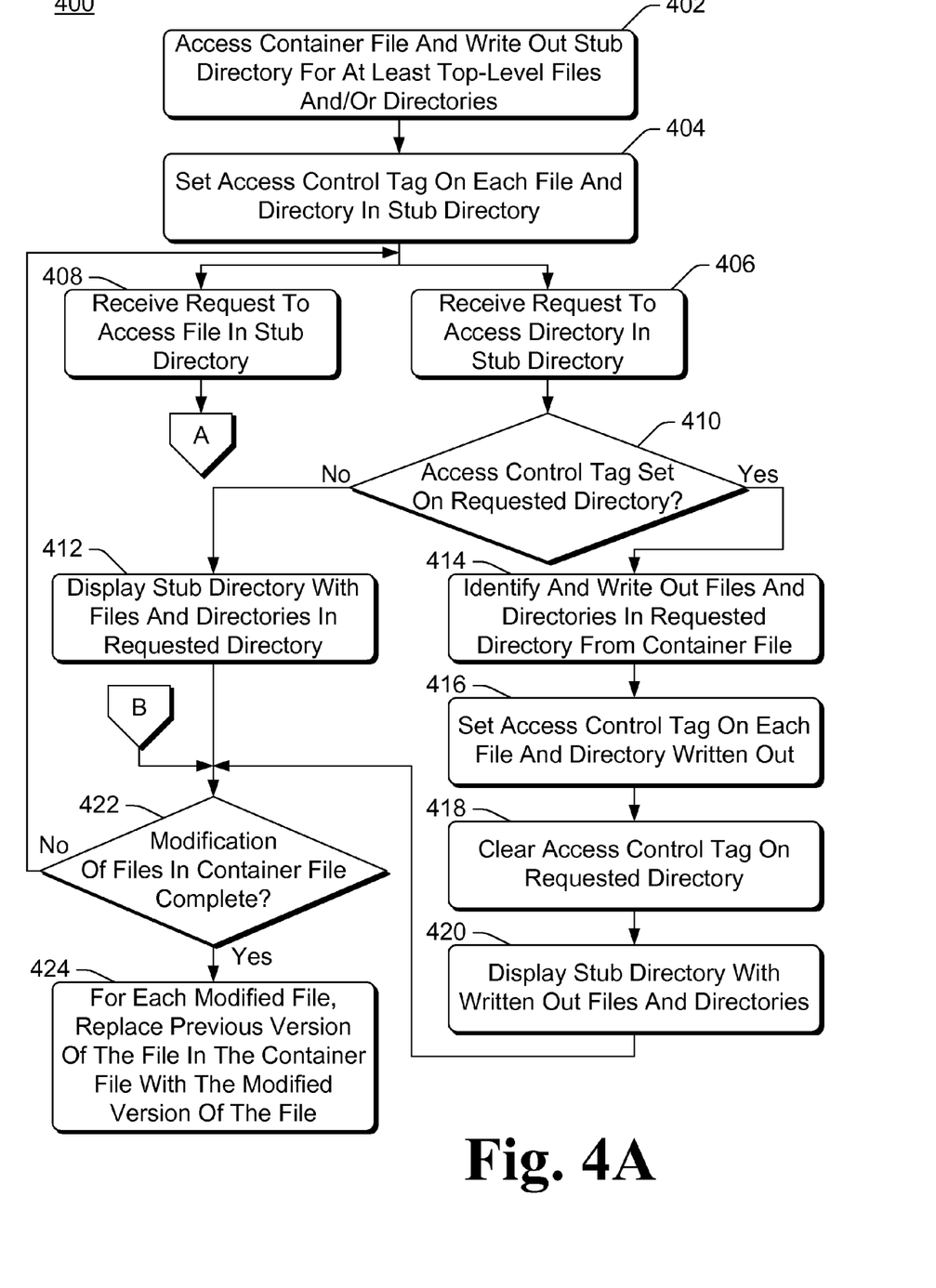
FIGS. 4A and 4B are a flowchart illustrating an example process for selectively modifying files of a container file in accordance with one or more embodiments.
Figure 4B:
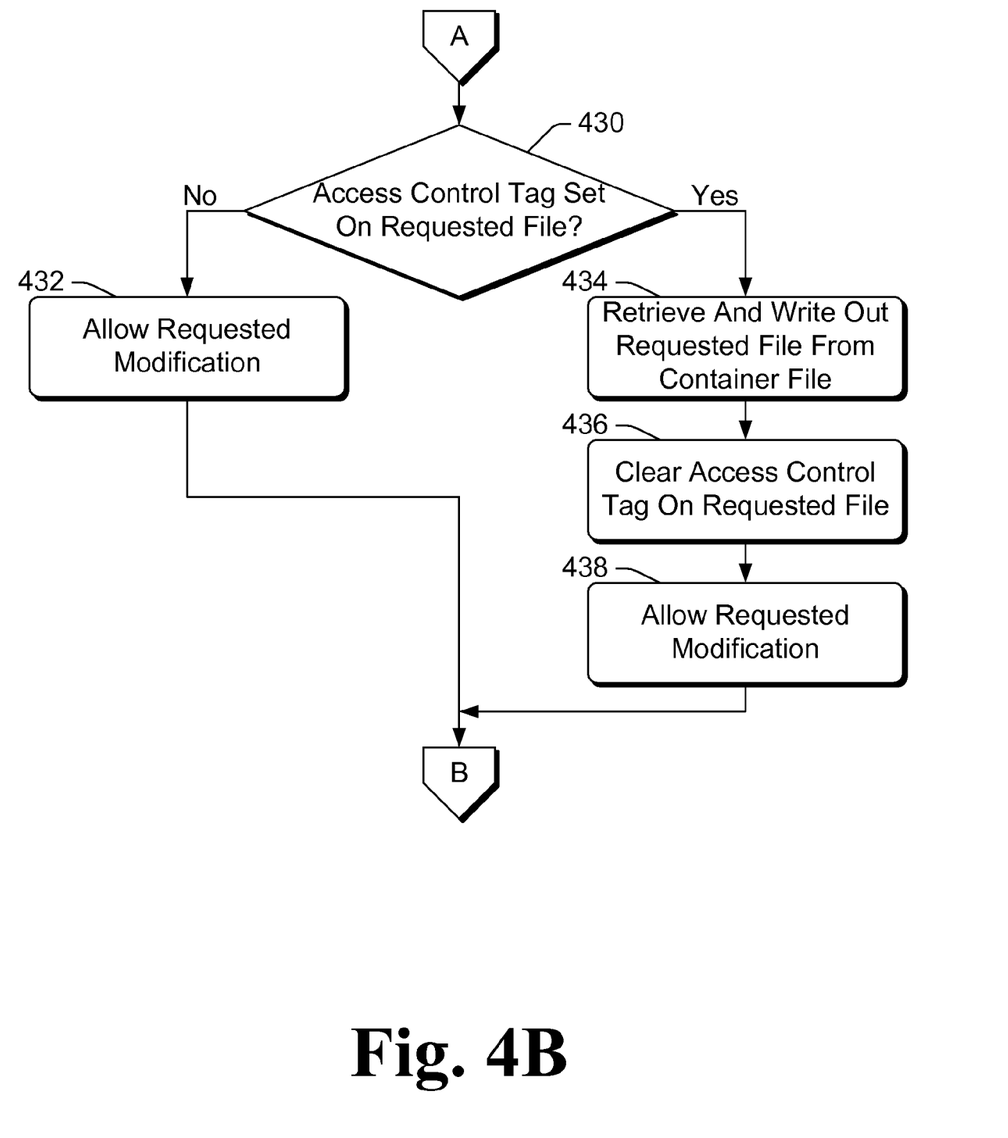

FIGS. 4A and 4B are a flowchart illustrating an example process 400 for selectively modifying files of a container file in accordance with one or more embodiments. Process 400 is carried out by a device, such as computing device 100 of FIG. 1, and can be implemented in software, firmware, hardware, or combinations thereof. Process 400 is an example process for selectively modifying files of a container file; additional discussions of selectively modifying files of a container file are included herein with reference to different figures. Process 400 illustrates an example in which access control tags are associated with both files and directories.

Initially, a container file is accessed and a stub directory is written out for at least top-level files and directories in the container file (act 402). As discussed above, the stub directory excludes the data of the files identified in the stub directory. Thus, the entire stub directory for all the files and directories in the container file is typically not written out in act 402. Rather, only the top-level files and directories are initially written out, such as directory 202 in the example of FIG. 2. Alternatively, this writing out may go one or more levels deeper than the top-level, such as to include directories 204 and 206 as well as file 208 in the example of FIG. 2.

An access control tag is set on each file and directory in the stub directory that was written out in act 402 (act 404). A request to access a directory in the stub directory can be received (act 406), or a request to access a file in the stub directory can be received (act 408). When a request to access a directory in the stub directory is received (act 406), a check is made as to whether the access control tag associated with the requested directory is set (act 410). If the access control tag is not set, then the stub directory is displayed including the files and directories in the requested directory (act 412). The access control tag not being set indicates that the data for the requested directory has already been extracted from the container file, so this data is available for display in act 412. A check is then made as to whether modification of files in the container file is complete (act 422), as discussed in more detail below.

However, if the access control tag is set, then the files and directories in the requested directory are identified and written out from the container file (act 414). The access control tag associated with each file and directory written out in act 414 is set (act 416). Additionally, the access control tag on the requested directory is cleared (act 418). The stub directory is displayed including the files and directories written out in act 414 (act 420).

A check is then made as to whether modification of files in the container file is complete (act 422). If modification of files in the container file is not complete, then process 400 returns to receive another request in act 406 or 408. However, if modification of files in the container file is complete, then for each modified file, the previous version of that file in the container file is replaced with a modified version of the file (act 424). This replacing in act 424 is analogous to that discussed above in act 320 of FIG. 3.

Returning to act 408, when a request to access a file in the stub directory is received (act 408), a check is made as to whether the access control tag associated with requested file is set (act 430 of FIG. 4B). If the access control tag is not set, then any requested modification are allowed on the file (act 432). These requested modifications are received from, for example, application 102 of FIG. 1.

However, if the access control tag is set, then the requested file is retrieved from the container file and written out to the storage device (act 434). The access control tag on the requested file is cleared (act 436), and any requested modifications are performed on the file (act 438). These requested modifications are received from, for example, application 102 of FIG. 1.

After modification is performed to the requested file in act 432 or act 438, process 400 returns to act 422 of FIG. 4A to check whether modification of files in the container file is complete. Process 400 can also proceed to act 422 without any modification having been performed on the requested file. For example, process 400 can proceed if an indication is received that no modification will be made at this time, if a request to access another file or directory is received, and so forth.

Thus, as can be seen from processes 300 and 400 of FIGS. 3, 4A, and 4B, a stub directory is initially written out for a container file that excludes data of the multiple files in that container file. As requests to access files and/or directories are received, the data for those files and/or directories are extracted from the container file. This extraction continues on a file by file basis, and optionally on a directory by directory basis, until modification of the files from the container file is complete.

Figure 5:
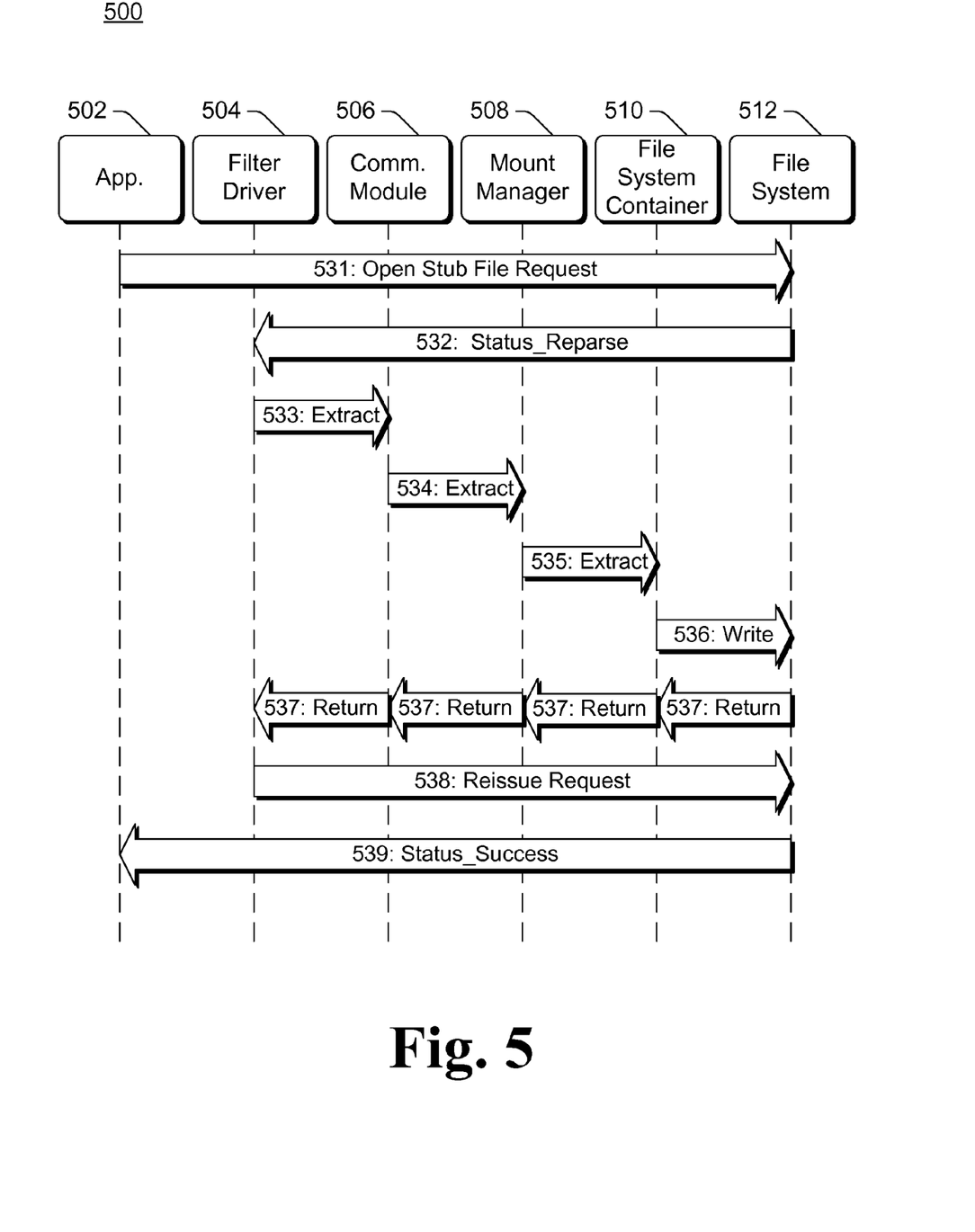
FIG. 5 illustrates an example data flow for accessing a file using the selectively modifying files of a container file in accordance with one or more embodiments.

FIG. 5 illustrates an example data flow for accessing a file using the selectively modifying files of a container file in accordance with one or more embodiments. In FIG. 5, a system 500 includes an application 502, filter driver 504, communications module 506, mount manager 508, file system container 510, and a file system 512. In one or more embodiments, application 502 is an application 102 of FIG. 1, filter driver 504 is a file system filter 104 of FIG. 1, and file system 512 is a file system 108 of FIG. 1. Additionally, in one or more embodiments communications module 506, mount manager 508, and file system container 510 are tools included as part of container modification module 106 of FIG. 1.

In FIG. 5, file system 512 is discussed as employing reparse points. File system 512 can be, for example, an NT file system. Although discussed with reference to reparse points, it is to be appreciated that system 500 can alternatively use other access control tags as discussed above.

The discussion of system 500 assumes that the stub file directory has already been written out to the storage device, and further assumes that reparse points are initially set for each file in the stub directory but are not set for directories in the stub directory. Initially, a request to open (or otherwise access) a stub file is submitted by an application 502 (act 531). The open request is received by file system 512, which notes that the requested file has a reparse point set. Accordingly, file system 512 fails to open the requested file and returns a status value of "Status_Reparse" (act 532). The Status_Reparse response is intercepted by filter driver 504.

In response to the Status_Reparse response, filter driver 504 issues a request to extract the requested file to communications module 506 (act 533). Filter driver 504 optionally checks whether the requested file is present in the container file prior to issuing this request to communications module 506. If the requested file is present in the container file then filter driver 504 issues this request to communications module 506; otherwise, filter driver 504 returns a failure indication to application 502.

Communications module 506 receives the request to extract the file from filter driver 504 and forwards the request to mount manager 508 (act 534). Mount manager 508 optionally verifies that the requested file is present in the stub directory. This verification can be performed in different manners, such as checking an identifier (e.g., a globally unique identifier (GUID)) of the requested file to the identifiers of the files in the stub directory. If no matching (e.g., equal) identifier in the stub directory is found, then mount manager 508 returns a failure indication to communication module 506, which is in turn passed to filter driver 504 and application 502.

However, if a matching (e.g., equal) identifier in the stub directory is found, then mount manager 508 issues an extract file request to file system container 510 (act 535). File system container 510 in turn retrieves the file from the container file and writes out the file data by sending a request to write the file data to the storage device to file system 512 (act 536). File system 512 writes the file data to the storage device, opening the stub file with a flag to bypass the reparse point, such as a File_Flag_Open_Reparse_Point flag.

Once the file data is written to the storage device, file system 512 returns an indication that the file data was successfully written out to the storage device (act 537). This return value is returned from file system 512 to file system container 510, which forwards the return value to mount manager 508, which forwards the return value to communications module 506, which forwards the return value to filter driver 504.

Upon receiving this return value that the file data was successfully written out, filter driver 504 knows that the data for the requested file can now be accessed by file system 512. Accordingly, in act 538 filter driver 504 removes the reparse point from the file and reissues the open stub file request from act 531. The reissued open request is received by file system 512, which now notes that the requested file no longer has a reparse point set. Accordingly, file system 512 opens the file and returns a handle of the file to application 502 along with an indication that the opening of the file was successful, such as by returning a value of "Status_Success" (act 539). Filter driver 504 allows the indication that the opening (or other accessing) of the file was successful to return to application 502 without intercepting the indication. Application 502 can subsequently make modifications to the file in a conventional manner by interacting with file system 512 and referring to the file using its handle.

Figure 6:
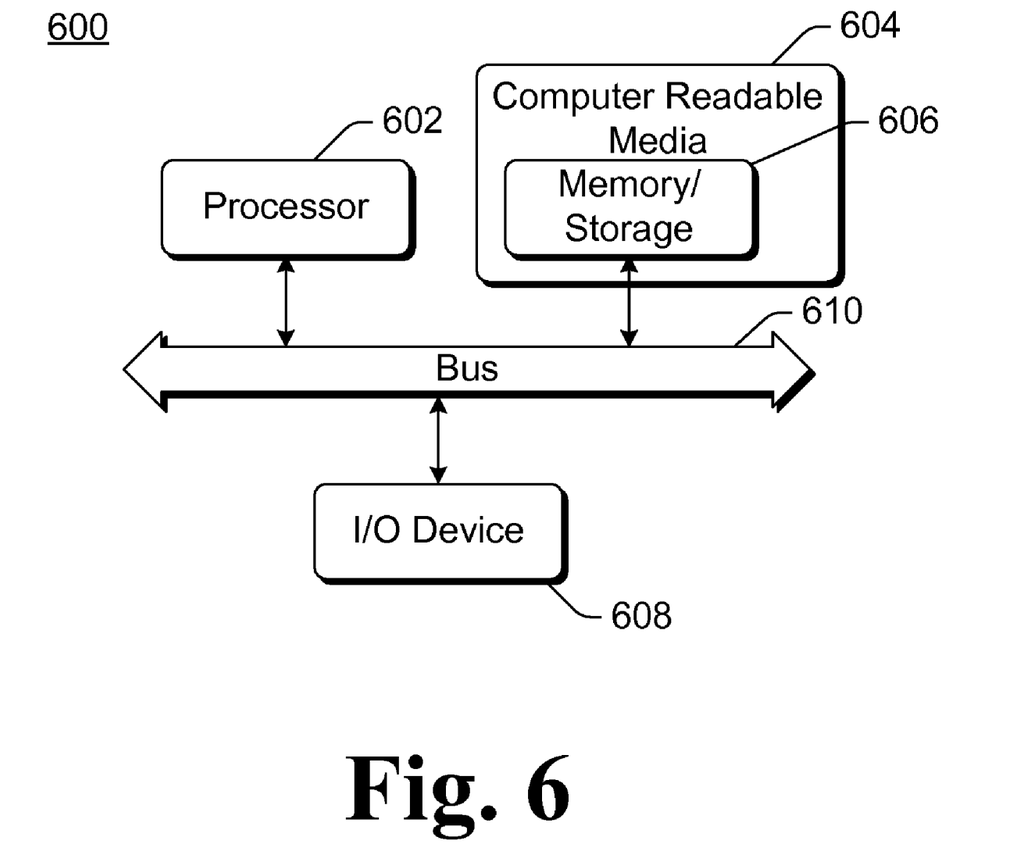
FIG. 6 illustrates an example computing device that can be configured to implement the selectively modifying files of a container file in accordance with one or more embodiments.

FIG. 6 illustrates an example computing device 600 that can be configured to implement the selectively modifying files of a container file in accordance with one or more embodiments. Computing device 600 can be, for example, computing device 100 of FIG. 1.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or I/O device(s) 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by processing unit(s) 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module," "functionality," and "logic" as used herein generally represent software, firmware, hardware, or combinations thereof. In the case of a software implementation, the module, functionality, or logic represents program code that performs specified tasks when executed on a processor (e.g., CPU or CPUs). The program code can be stored in one or more computer readable memory devices, further description of which may be found with reference to FIG. 6. The features of the selectively modifying files of a container file techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer storage media having stored thereon multiple instructions that, when executed by one or more processors of a device, cause the one or more processors to:

write out a stub directory to a storage device for multiple files in a container file, the multiple files each being associated with an access control tag, the stub directory initially including identifiers of the multiple files but excluding data of the multiple files, where the data of a file is not included in the stub directory unless the file is accessed for modification and an associated access control tag is set, the stub directory enabling a file system to initially identify the multiple files but not access the data of the multiple files;

receive a request to access the file of the multiple files for modification;

determine, responsive to the request to access the file, whether the access control tag associated with the file is set;

in response to a determination that the access control tag associated with the file is not set, allow a requested modification of the file to generate a modified version of the file without writing out the data of the file to the stub directory;

in response to a determination that the access control tag associated with the file is set:

write out the data of the file to the stub directory on the storage device and clear the access control tag associated with the file; and allow the requested modification to be performed on the file written out to the stub directory to generate the modified version of the file; and replace, after modification of the file is completed, a previous version of the file in the container file with the modified version of the file, the modification of the file determined completed based on at least one of receiving a user input indicating that the modification is complete or receiving an indication that the modification is complete from an application performing the modification.

2. One or more computer storage media as recited in claim 1, wherein to replace the previous version of the file in the container file with the modified version of the file is to replace the previous version of the file after modification of multiple ones of the multiple files has been completed.

3. One or more computer storage media as recited in claim 1, wherein to write out the stub directory is to:

initially write out the stub directory including a name of a directory in the container file but not names of one or more directories and one or more files in the directory; and extract, from the container file, the names of the one or more directories and the one or more files in the directory in response to a request to access the directory.

4. One or more computer storage media as recited in claim 1, the multiple instructions further causing the one or more processors to, for each of the multiple files set the access control tag associated with the file in the stub directory.

5. One or more computer storage media as recited in claim 4, wherein to replace the previous version of the file in the container file with the modified version of the file is to:

identify each file of the multiple files in the stub directory having an associated access control tag that is cleared; and for each identified file, replace a previous version of the identified file in the container file with a modified version of the file.

6. One or more computer storage media as recited in claim 4, wherein the indication from the application performing the modification includes at least one of a lapse of a threshold amount of time after the modification, a closing of the application, or a selection of a different file for modification by the application.

7. One or more computer storage media as recited in claim 1, the multiple instructions further causing the one or more processors to:
receive, after the file has been written out, a subsequent request to access the file; and
perform a subsequent requested modification to the file without writing out the file to the stub directory again.

8. A device-implemented method, comprising:
writing out a stub directory to a storage device for multiple files and multiple directories in a container file, the stub directory including a directory structure of the container file, identifiers of the multiple files, and identifiers of the multiple directories but excluding data of the multiple files and the multiple directories, where the data of a file is not included in the stub directory unless the file is accessed for modification and an associated access control tag is set;
setting, for each of the multiple files, an access control tag associated with the file;
receiving a request to access the file of the multiple files for modification;
checking whether the access control tag associated with the file is set;
if the access control tag associated with the file is not set, then allowing a modification to the file without writing out the data of the file from the container file to the stub directory; and
if the access control tag associated with the file is set, then:
writing out the data of the file from the container file to the stub directory on the storage device;
clearing the access control tag associated with the file; and
allowing the modification to the file;
replacing a version of the file in the container file with a modified version of the file after modification of the file is completed, the modification of the file determined completed based on at least one of receiving a user input indicating that the modification is complete or receiving an indication that the modification is complete from an application performing the modification.

9. A method as recited in claim 8, wherein the modified version of the file is generated in response to the modification to the file being allowed.

10. A method as recited in claim 8, the replacing the version of the file in the container file with the modified version of the file comprising replacing the version of the file after modification of multiple ones of the multiple files has been completed.

11. A method as recited in claim 10, further comprising identifying the multiple ones of the multiple files as those files having an associated access control tag that is cleared.

12. A method as recited in claim 8, the writing out the stub directory comprising:
initially writing out the stub directory including a name of a first directory in the container file but not names of one or more directories in the first directory; and
extracting, from the container file, the names of the one or more directories in the first directory in response to a request to access the first directory.

13. A method as recited in claim 8, the writing out the stub directory comprising:
initially writing out the stub directory including a name of a first directory in the container file but not names of one or more files in the first directory;
extracting, from the container file, the names of the one or more files in the first directory in response to a request to access the first directory; and
setting, for each of the one or more files in the first directory, an access control tag associated with the file.

14. A method as recited in claim 8, the access control tag comprising a reparse tag of a reparse point.

15. One or more computer storage media having stored thereon multiple instructions that, when executed by one or more processors of a device, cause the one or more processors to:
receive a status value from a file system in response to a request to access a file for modification in a stub directory that is written out in response to a request to access a corresponding container file, the stub directory including a directory structure of the container file, identifiers of multiple files, and identifiers of multiple directories from the container file but excluding data of the multiple files unless the file of the multiple files is currently being accessed for modification, the status value indicating that the request to access the file failed because an access control tag associated with the file was set;
send a request to a container modification module to extract the file from the container file and initiate the file being written out to the stub directory in response to receiving the status value indicating that the request to access the file failed;
after the file is extracted from the container file and written out to the stub directory, clear the access control tag associated with the file and reissue the request to the file system;
allow a requested modification to be performed on the file written out to the stub directory to generate a modified version of the file; and
after modification of the file is completed, send the modified version of the file to the container modification module to replace a previous version of the file in the container file, the modification of the file is determined completed based on at least one of receiving a user input indicating that the modification is complete or receiving an indication that the modification is complete from an application performing the modification.

16. One or more computer storage media as recited in claim 15, the multiple instructions further causing the one or more processors to:
receive the status value from the file system in response to a second request to access a directory in the stub directory from the container file, the status value indicating that the second request failed because an access control tag associated with the directory was set;
send a request to the container modification module to have names of one or more directories in the directory extracted from the container file and written out to the stub directory; and
after the names of the one or more directories are extracted from the container file and written out to the stub directory, clear the access control tag associated with the directory and reissue the second request to the file system.

17. One or more computer storage media as recited in claim 15, wherein the access control tag comprises a reparse tag of a reparse point.

18. One or more computer storage media as recited in claim 15, the multiple instructions further causing the one or more processors to allow an indication that accessing the file was successful to be returned to an application issuing the request.

* * * * *